United States Patent
Nagaraja

(10) Patent No.: US 12,463,968 B2
(45) Date of Patent: Nov. 4, 2025

(54) METHOD FOR COMPUTER-IMPLEMENTED IDENTIFYING AN UNAUTHORIZED ACCESS TO A WIND FARM

(71) Applicant: Siemens Gamesa Renewable Energy A/S, Brande (DK)

(72) Inventor: K. S. Nagaraja, Karnataka (IN)

(73) Assignee: Siemens Gamesa Renewable Energy A/S, Brande (DK)

( * ) Notice: Subject to any disclaimer, the term of this patent is extended or adjusted under 35 U.S.C. 154(b) by 284 days.

(21) Appl. No.: 17/908,323

(22) PCT Filed: Mar. 3, 2021

(86) PCT No.: PCT/EP2021/055267
§ 371 (c)(1),
(2) Date: Aug. 31, 2022

(87) PCT Pub. No.: WO2021/180528
PCT Pub. Date: Sep. 16, 2021

(65) Prior Publication Data
US 2023/0098418 A1   Mar. 30, 2023

(30) Foreign Application Priority Data
Mar. 11, 2020  (EP) .................................... 20162381

(51) Int. Cl.
*H04L 9/40* (2022.01)
*F03D 17/00* (2016.01)

(52) U.S. Cl.
CPC .......... *H04L 63/0876* (2013.01); *F03D 17/00* (2016.05)

(58) Field of Classification Search
CPC ..... H04L 63/0876; F03D 17/00; F03D 80/50; F05B 2240/96; F05B 2260/84;
(Continued)

(56) References Cited

U.S. PATENT DOCUMENTS

2005/0284225 A1*  12/2005  Luo .................. F03D 15/10
73/593
2009/0153656 A1   6/2009  Sharonova
(Continued)

FOREIGN PATENT DOCUMENTS

| CN | 105 719 002 A | 6/2016 |
| EP | 3 428 756 A1 | 1/2019 |
| WO | WO-2016172514 A1 * | 10/2016 |

OTHER PUBLICATIONS

International Search Report & Written Opinion for PCT/EP2021/055267, mailed on May 10, 2021.
(Continued)

*Primary Examiner* — Tan Doan
(74) *Attorney, Agent, or Firm* — Schmeiser, Olsen & Watts, LLP

(57) ABSTRACT

A method for computer-implemented identifying an unauthorized access to a wind farm is provided by obtaining environmental and operational data of the wind farm from a repository, which include technical data and organizational data of the wind farm indicating tasks to be dealt with in the wind farm in the future. Based on the environmental and operational data, for a predetermined time interval, a prediction of the operation and/or states of the wind farm is determined by a trained data driven mode. The trained data driven model provides a prediction of the operation and/or states of the wind farm as a digital output. The prediction is compared to operational conditions of the wind farm resulting from current or past user machine interactions of a user. An unauthorized access is identified in case of a predetermined deviation of the obtained operational conditions from the prediction of the operation and/or states of the wind farm.

9 Claims, 2 Drawing Sheets

Figure 1:
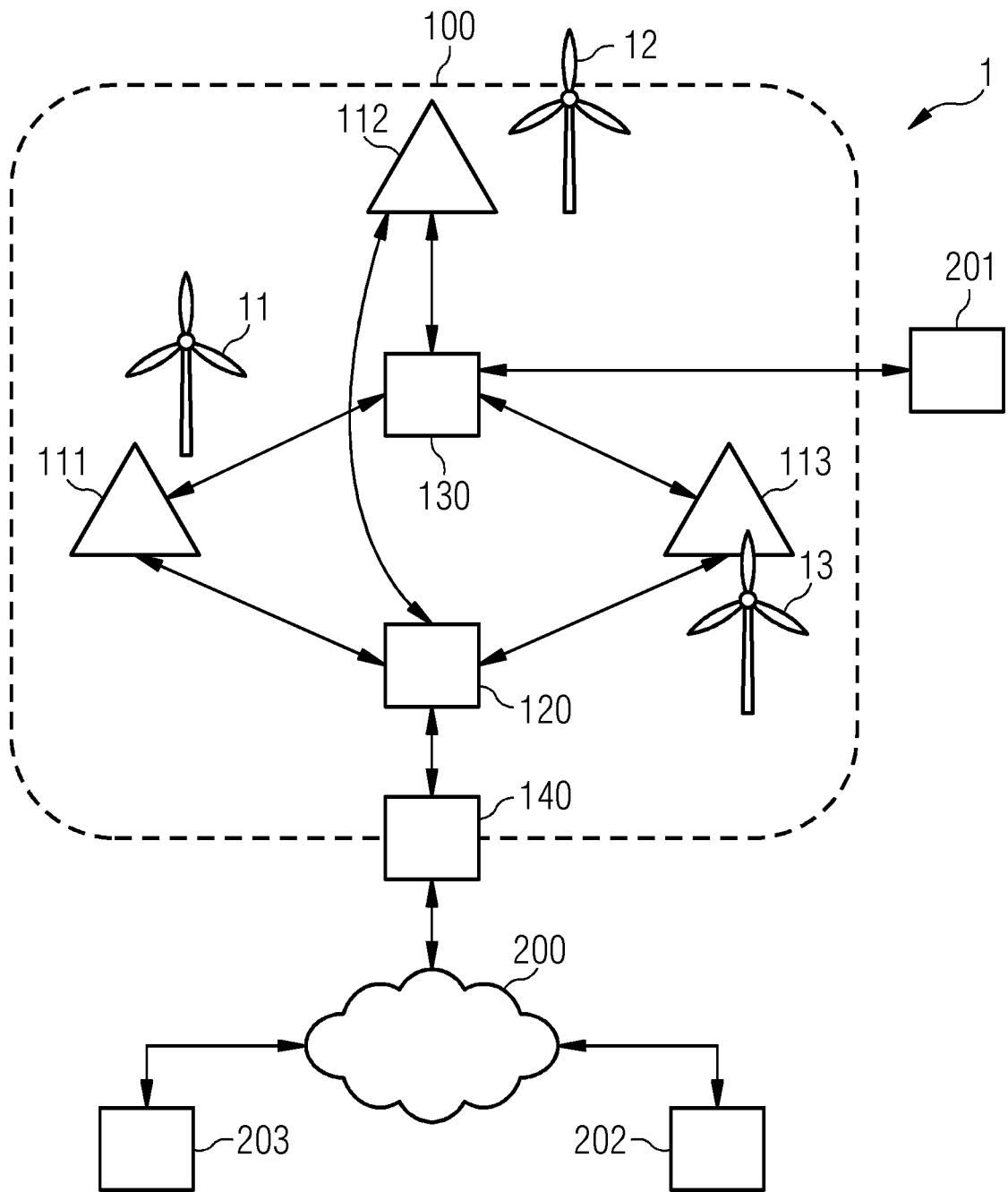

(58) Field of Classification Search
CPC . G06N 3/045; G06N 5/01; G06N 3/08; Y02E 10/72; G05B 13/048
USPC .......................................................... 726/23
See application file for complete search history.

(56) References Cited

U.S. PATENT DOCUMENTS

| | | | | |
|---|---|---|---|---|
| 2013/0261988 A1* | 10/2013 | Lim | ........................ | F03D 17/00 73/112.01 |
| 2017/0363065 A1* | 12/2017 | Jakobs | ................ | H04L 63/0823 |
| 2019/0310891 A1* | 10/2019 | Baldasaro | ............... | G06F 9/542 |

OTHER PUBLICATIONS

Netland Oyvind et al: "Experiences from Wind Turbine Pilot Test of a Remote Inspection System", A Energy Procedia, Elsevier, NL, vol. 137, Dec. 15, 2017 (Dec. 15, 2017), pp. 382-390.

* cited by examiner

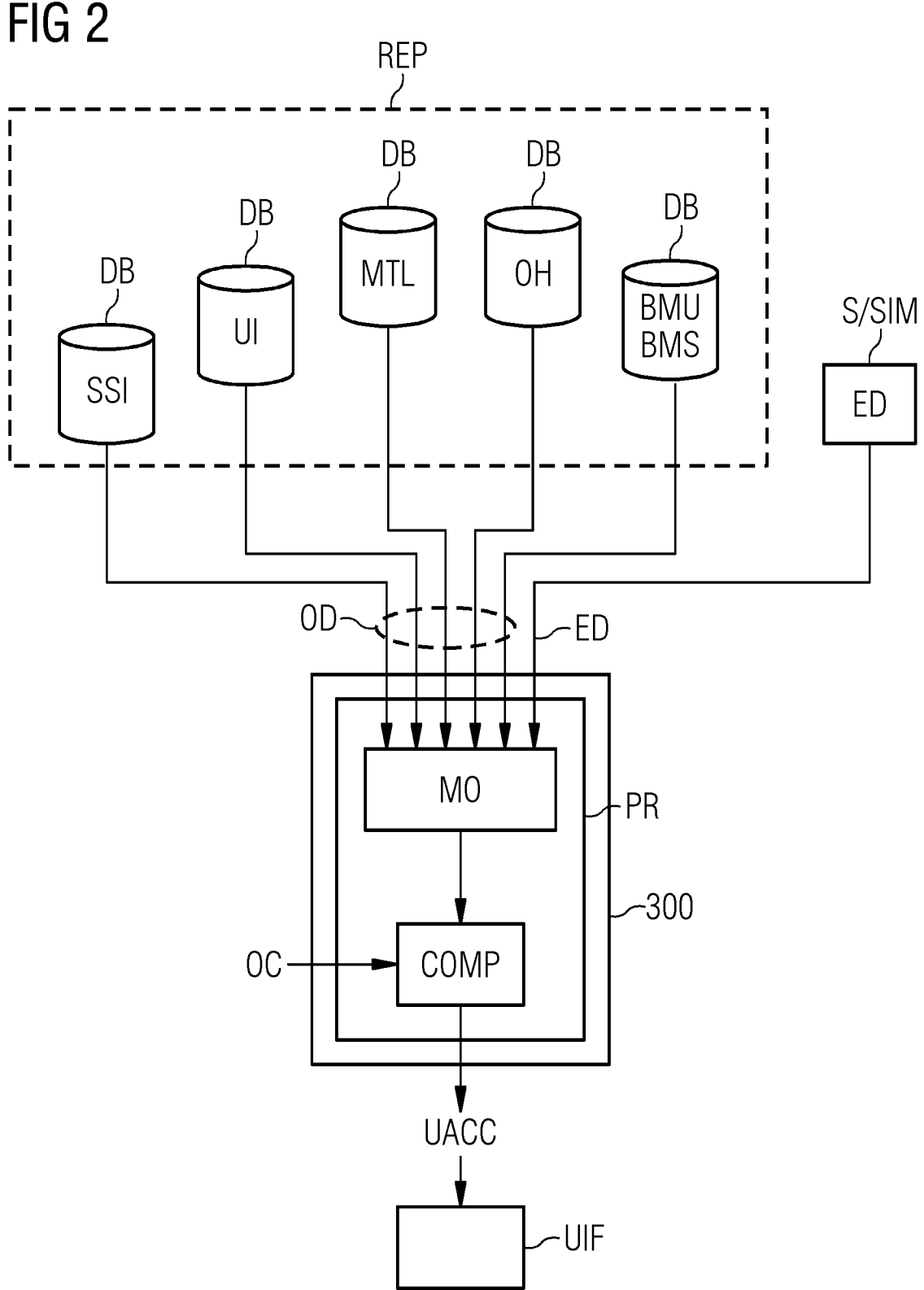

METHOD FOR COMPUTER-IMPLEMENTED IDENTIFYING AN UNAUTHORIZED ACCESS TO A WIND FARM

CROSS-REFERENCE TO RELATED APPLICATIONS

This application claims priority to PCT Application No. PCT/EP2021/055267, having a filing date of Mar. 3, 2021, which claims priority to EP Application No. 20162381.6, having a filing date of Mar. 11, 2020, the entire contents both of which are hereby incorporated by reference.

FIELD OF TECHNOLOGY

The following refers to a method and an apparatus for computer-implemented identifying unauthorized access to a wind farm.

BACKGROUND

Wind farms comprise of a plurality of wind turbines. For processing measurement values received from wind sensors (i.e., anemometers) to estimate a wind direction, and providing control commands for adjusting, among others, a yaw angle or pitch angle, each wind turbine comprises a processing unit. Besides the processing unit, each wind turbine comprises a communication device being communicable connected to an IT infrastructure of the wind farm.

The wind farm IT infrastructure consists of the processing units of the plurality of wind turbines, a wind farm controlling unit and a supervisory control and data acquisition system, known as SCADA system. The SCADA system is adapted to monitor and store operational data of the plurality of wind turbines as well as environmental parameters, such as wind speed, wind direction and so on, provided by a wind farm measuring device. The operational data may be requested from the plurality of wind turbines by the SCADA system. Alternatively, the operational data may be transmitted from the plurality of wind turbines to the SCADA system. The wind farm controlling unit is adapted to monitor operation of the plurality of wind turbines and to transmit control commands to them. The control commands are generated by the wind farm controlling unit or received from an external user station and/or a grid operator station.

Nowadays, wind farms have reached a size where they can be classified as a Critical National Infrastructure (CNI). Therefore, intrusion into single wind turbines as well as into the IT infrastructure of a wind farm by unauthorized parties, such as hacker, can cause huge impact on the grid network the wind farm is connected to. In times of cyber war cutting of a wind farm classified as a CNI is non-destructive and has the same impact as total destruction. In order to prevent any negative impact on the wind farm, identification and response to a cyber threat is required.

As wind farms are unmanned, a response to an intrusion can only be initiated after an alarm has been triggered to a supervisor station of a control center. The main issue is that software incidents are difficult to detect, especially if known software security solutions have already been bypassed. A need for fast identification of a cyber threat and response to the threat on the fly is necessary in order to limit the damage to the wind farm.

Cyber security systems often are organized on a corporate level. Threats to an IT infrastructure are analyzed and solutions are developed to match the understanding of the threat. Often, there are two main security systems shortfalls: A first solution is a rule-based security system which considers known threats. The second solution is scalability of a cyber security system which means that the organization cannot move at the same pace as cyber criminals change their strategy in order to access a system.

To detect hacker intrusions, honeypots or honeynets, hardened routers, network firewalls, web application firewalls and so on are used as common technologies. These technologies focus on baiting a hacker while these are scanning the system for weaknesses.

SUMMARY

An aspect relates to providing an easy method in order to detect an unauthorized access to a wind farm.

Embodiments of the invention provide a method for computer-implemented identifying an unauthorized access to a wind farm. The wind farm comprises a number of wind turbines, a number of subsystems for controlling and/or monitoring the number of wind turbines and a repository for storing wind farm data. The repository for storing wind farm data may consist of one or more databases or data storages. The databases and/or data storages store data about operation history, measurement values (e.g., regarding produced power, wind, wind direction, down-times of single wind turbines, information about software releases of the respective turbines, user access to respective wind turbines and their IT-infrastructure, environmental data, and so on). The data stored in the repository may be provided by a number of sensors of the wind turbines and/or wind farm external sensors and/or a condition monitoring system of the wind farm. The repository may be part of a supervisory control and data acquisition system (called SCADA system) used to control and monitor a number of wind turbines.

The term "subsystem" refers to a wind farm IT infrastructure as well as to specific components of a number of wind turbines. In particular, the subsystem comprises an IT infrastructure having a wind farm controlling unit and a supervisory control and data acquisition system as first network components. The supervisory control and data acquisition system is also known as SCADA system. The first network components are communicable connected, via a router to second network components outside the wind farm IT infrastructure. The second network components comprise a wind farm measuring device, a user station, and a grid operator station. The second network components are connected, by way of example, via internet to the router for transmitting and/or receiving control commands or operational data. The communication link between two (first and/or second) network components may be wired or wireless. The second network components can be regarded as subsystems as well.

The term "processing unit" refers to a processor and a communication device for exchanging data with another communication device. In other words, each wind turbine processing unit is adapted to receive data, for example measured values captured by the measuring device or the wind farm controlling unit, and/or to transmit data to the wind farm controlling unit and/or the SCADA system as well as to control the wind turbine.

The term "wind farm controlling unit" refers to a controlling unit which is adapted to transmit control commands to at least some of the plurality of wind turbines of the wind farm, in order to operate the wind farm in a specific way, e.g., to produce a demand power.

The term "supervisory control and data acquisition system" (SCADA system) refers to a processor or a processor system which is adapted to gather and store operational data of the number of wind turbines of the wind farm. The stored operational data are typically used for further investigation or development of control strategies.

The user station is typically used to transmit control commands to the controlling unit. Furthermore, it may be used, for example to initiate software upgrades or to deal with any maintenance issues. The controlling unit is adapted to either forward the control commands without altering them or to create adapted control commands. The user station control commands generated by a user (e.g., an operator or supervisor) or an software may be such to control or update the wind farm as a whole, e.g., with respect to demand power, or to control respective wind turbines of the wind farm, e.g., with respect to a power to be produced by them at a specific point of time, or to switch them on or off. The user station control commands generated by a user may be such to acquire data from the repository and the SCADA system, respectively. Furthermore, the user station may be used to upgrade the software of a specific or a plurality of the number of turbines.

The grid operator station refers to a computer or a processing unit for processing operational data of the wind farm, such as produced power.

According to the method of embodiments of the invention, the following steps i) to v) are performed at each time point of one or more time points during the operation of the wind farm.

In step i), operational data of the wind farm are obtained from the repository. In the following, the term "obtaining" means that the operational data are received by a processor implementing the method of embodiments of the invention. Operational data comprise technical data of the number of wind turbines and the number of subsystems. In addition, operational data comprise organizational data indicating tasks to be dealt with in the wind farm in the future.

In step ii), environmental data providing by the wind farm measuring device are obtained. In particular, environmental data consist of weather data such as wind speed, wind direction, and so on as well as forecast information with regard to the environmental parameters.

In step iii), for a predetermined time interval, a prediction of the operation and/or states of the wind farm is determined by processing the operational data and the environmental data by a trained data driven model, where the operational data and the environmental data are fed as a digital input to the trained data driven model and the trained data driven model provides the prediction of the operation and/or states of the wind farm as a digital output for the predetermined time interval.

In step iv), operational conditions of the wind farm are obtained which result from current or past user machine interactions of a user (e.g., operator) and one of the wind turbines and/or the subsystems, where the operational conditions are obtained within the predetermined time interval.

In step v), an unauthorized access to the wind farm is determined by comparing the operational conditions with the prediction of the operation and/or states of the wind farm. Thereby, the unauthorized access is characterized by a predetermined deviation of the obtained operational conditions from the prediction of the operation and/or states of the wind farm.

The method of embodiments of the invention provides an easy and straightforward method for determining an unauthorized access to a wind farm based on the comparison of the prediction of the operation and/or states of the wind farm and its technical components with actual operational conditions which are acquired at run time. To do so, a trained data driven model is used to predict the operation and/or states of the wind farm for a predetermined time interval. The model is trained by training data comprising a plurality of historic operational data of the wind farm which are influenced by user machine interactions and environmental conditions. These data have been obtained and acquired in the past together with the information about a normal or an abnormal condition of the wind farm and at least one component of its subsystems, respectively.

Any known data driven model being learned by machine learning may be used in the method according to embodiments of the invention. The data driven models can be trained by using data available from the repository. In an embodiment, the trained data driven model is a neural network, a convolutional neural network. Alternatively, a cognitive algorithm, reinforcement learning or trained data model which are based on pattern recognition or based on artificial intelligence may also be implemented in the method of embodiments of the invention.

In an embodiment of the invention, the trained data driven model consists of a user behavior model considering a user role and user skills, where according to the user behavior model a user is capable of performing a specific set of tasks authorized by his user role and user skills. In particular, each task consists of a set of operations performed against a set of the subsystems. This results in a single or a sequence (batch) of operations which can be used for training and prediction of the operation and/or states of the wind farm and its components, in particular subsystems.

Operations are governed by various operating conditions. This may include, but are not limited to user administration activities like the creation of new users and the assignment of one or more roles and skills to a user. It may include maintenance plans schedules, services tickets against a specific user who is operating, required personal skills and location details of specific users. The various operation conditions may further include information about the release of new firmware packages for specific class or number of turbines. Alarm conditions and alarm status in a number of turbines and/or the SCADA system and/or the grid controller may define an operating condition. A snapshot of a subsystem and its operating states during ongoing operations is a further operating condition. Furthermore, weather conditions like temperature, wind speed, and so on (more general environmental conditions) as well as park deployment status like commissioning, service, versions of software/firmware, hardware and classes of turbines installed, constitute operating conditions.

In an embodiment of the invention, an information based on the unauthorized access is output via a user interface. For example, the information about the unauthorized access to a specific first component of the wind farm and one of its wind turbines or subsystems itself may be output via the user interface. Alternatively, or additionally, a warning may be provided via the user interface in case that an unauthorized access has been detected. Last, a human operator is informed about an unexpected deviation of the obtained operational conditions from the predicted operational data with respect to the operation and/or states of the wind farm. In an embodiment, the user interface comprises a visual user interface, but it may also comprise a user interface of another type (e.g., an acoustic interface).

In another embodiment, the operational data and/or the operational conditions are obtained by a digital condition monitoring system. Alternatively, or additionally, the operational data and/or operational conditions are obtained by one or more sensors provided within the wind farm. Condition monitoring systems are known from vibration monitoring where errors on mechanical devices, e.g., on the drive train, are predicted via the analysis of the vibration data recorded by the vibration condition monitoring system. Such a vibration condition monitoring system is based on a frequency analysis to determine whether a deviation is present from a boundary curve where, when the measured frequency exceeds a boundary curve, a warning is generated.

Besides the above method, embodiments of the invention refer to an apparatus for computer-implemented identifying an unauthorized access to a wind farm, where the apparatus is configured to perform the method according to embodiments of the invention or one or more preferred embodiments of the method.

Moreover, embodiments of the invention refer to a computer program product (non-transitory computer readable storage medium having instructions, which when executed by a processor, perform actions) with a program code, which is stored on a non-transitory machine readable carrier, for carrying out the method according to embodiments of the invention or one or more preferred embodiments thereof when the program code is executed on a computer.

Furthermore, embodiments of the invention refer to a computer program with a program code for carrying out the method according to the invention or one or more preferred embodiments thereof when the program code is executed on a computer.

BRIEF DESCRIPTION

Some of the embodiments will be described in detail, with reference to the following figures, wherein like designations denote like members, wherein:

FIG. 1 is a schematic illustration of a wind farm comprising a number of wind turbines and a number of subsystems for controlling and/or monitoring the number of wind turbines; and FIG. 2 shows a schematic illustration of an apparatus for performing an embodiment of the invention.

DETAILED DESCRIPTION

FIG. 1 shows a wind farm 100. The wind farm 100 comprises, by way of example one, three (3) wind turbines 11, 12, 13. However, the number of wind turbines may be greater or less than three. Each wind turbine 11, 12, 13 comprises an upper section with a rotor and a nacelle on the top of a tower, where the upper section can be rotated around a vertical yaw axis in order to vary the yaw angle of the respective turbine.

For controlling and/or monitoring of the number of wind turbines 11, 12, 13, a wind farm IT infrastructure 1 is used. The wind farm IT infrastructure 1 comprises a number of wind turbine processing units 111, 112, 113, a wind farm controlling unit 120, and a supervisory control and data acquisition system 130, also referred to as SCADA system 130. The number of wind turbine processing units 111, 112, 113 is assigned to a respective wind turbine and therefore corresponds to the number of wind turbines 11, 12, 13 within the wind farm 100. The wind turbine processing units 111, 112, 113, the wind farm controlling unit 120, and the SCADA system 130 are called first network components as they are located within the wind farm 100.

Mechanical and electoral components of the wind turbines (tower, nacelle, rotor, generator, inverter and so on) and the first network components constitute respective subsystems of the wind farm.

The wind turbine processing units 111, 112, 113 are adapted to process data and to exchange data via a not shown communication device of the respective processing unit with one of the other first network components. Hence, the wind turbine processing units 111, 112, 113 are adapted to receive data and control commands received from the wind farm controlling unit 120 and/or measured values captured by measuring devices of the wind turbines and/or external measuring devices. In addition, the wind turbine processing units 111, 112, 113 are adapted to transmit data to the controlling unit 120 and/or the SCADA system 130.

The SCADA system 130 is adapted to gather operational data of the respective wind turbines and received by the wind turbine processing units 111, 112, 113 and store them in a not shown repository REP or data storage.

The wind farm controlling unit 120 is adapted to transmit control data to the wind turbine processing units to control the associated wind turbines with respect to a power to be generated, to switch them on or off or to upload software/firmware updates, to set configuration parameters for turbines, and so on.

The first network components are communicable connected, via a router 140, to second network components outside the wind farm 100, where the second network components comprise, by way of example only, a wind farm measuring device 201, a user station 202, and a grid operator station 203.

The wind farm measuring device 201 provides environmental data, in particular weather data, for example wind speed, wind direction, temperature, air pressure and so on.

The user station 202 is used to generate control commands suitable for controlling respective wind turbines. Control commands are transmitted, via the router 140, to the wind farm controlling unit 120 which transmits them either without altering them or as adapted control commands to the respective wind turbine processing units 111, 112, 113.

In a normal condition, the subsystem of the wind farm 100 cause a specific amount of network traffic and sensor data which may be different for different days and/or time of the day and/or dependent on environmental conditions and/or dependent on user machine interactions of specific users at the user station 202. The term "user machine interaction" relates to an access to any of the subsystems, be it a physical access or a data exchange.

For example, a user who accesses the wind farm controlling unit 120 from the user station 202 causes a specific amount of network traffic within the wind farm IT infrastructure 1. In particular, the data flow between the user station 202 and the wind farm controlling unit 120 may be increased and/or the processor load of the wind farm controlling unit 120 may be increased and/or access time to a memory of the wind farm controlling unit 120 may be increased. More specifically, the amount of traffic within the wind farm IT infrastructure 1 varies depending on what user (of a plurality of users) accesses the wind farm controlling unit 120 as each user has assigned a user role (e.g., administrator, operator, IT specialist, and so on) and user skills, where a specific user is capable of performing a specific set of tasks authorized by his user role and his user skills. Each task consists of a set of operations (i.e., one or more operations) performed against a set of the subsystems resulting in a sequence (batch) of operations.

Operations are governed by various operating conditions. This may include, but is not limited to, user administration activities like the creation of new users and the assignment of one or more roles and skills to a user. It may include maintenance plans schedules, service tickets against a specific user who is operating, required personal skills and location details of specific users. The various operation conditions may further include information about the release of new firmware packages for specific class or number of turbines. The various operation conditions may further include alarm conditions and alarm status in a number of turbines and/or the SCADA system and/or the grid controller. A snapshot of a subsystem and its operating states during ongoing operations is a further operating condition. Furthermore, weather conditions like temperature, wind speed, and so on (more general environmental conditions) as well as park deployment status like commissioning, service, versions of software/firmware, hardware and classes of turbines installed, constitute operating conditions.

In a normal condition, the individual network components of the wind farm IT infrastructure 1 as well as users accessing the wind farm IT infrastructure 1 from outside cause a different network traffic and/or load of respective network components compared to the case where an unauthorized access to the wind farm IT infrastructure takes place. The method as described in the following provides an easy method to identify an unauthorized access to the wind farm IT infrastructure, i.e., an unauthorized access to one or more of the first network components.

To do so, the wind farm IT infrastructure 1 is equipped with a not shown condition monitoring system and/or one or more sensors and/or monitoring means to monitor (current) operational conditions OC of the first network components of the wind farm IT infrastructure 1 (including the router 140). The operational conditions OC comprise conditions of the first network components and/or an information about the data flow between the first network components as well as between one of the first network components and one or more of the second network components, and vice versa.

The operational conditions OC can be characterized by operational data characteristics consisting of patterns, state variables, responses or load of the first and/or second network components, user access (physically or electronically), data downloads, or user geographical location of an access from outside the wind farm IT infrastructure. The respective operational conditions OC are captured by the condition monitoring system and/or the one or more sensors installed within the wind farm IT infrastructure 1. Immediately after having captured the operational conditions OC, they are transferred by a suitable communication link to a controller 300 of the wind farm 100 (see FIG. 2).

The controller 300 comprises a processor PR implementing a trained data driven model MO receiving operational data OD and environmental data ED as digital input and providing a prediction of an expected operation of the wind farm as a digital output. This prediction is used for a comparison with the operational data OC. The comparison may be part of the data driven model MO or be made with the output of the data driven model MO as shown in FIG. 2.

Depending on the comparison result, an indication about an unauthorized access UACC is output or not.

In the embodiment described herein, the trained data driven model MO may be based on reinforcement learning or artificial intelligence. However, a cognitive algorithm, a trained data driven model which is based on pattern recognition or based on a neural network, such as a convolutional neural network, decision trees, random forest, behavior tree, may be used as well.

In the embodiment of FIG. 2, the indication about an unauthorized access UACC produced as a (subsequent) output of the model MO results in an output of a user interface UIF which is only shown schematically. In an embodiment, the user interface UIF comprises a display. The user interface UIF provides information for a human operator for further investigation of the captured operational data. The output based on the indication about an unauthorized access UACC may be an information about the unauthorized access itself so that the operator is informed about an intrusion into the wind farm and, in particular, its IT infrastructure 1. Alternatively, or additionally, the output may comprise an information which of the first network components has been accessed unauthorized. The indication about an unauthorized access may also result in counter measures such as a shutdown of the router 140 and/or a wind turbine 11, 12, 13.

The method as described above enables identifying an unauthorized access to the wind farm 100 by consistently analyzing data within and from/to the wind farm IT infrastructure by comparing patterns and state variables or user access and data downloads, on the fly. The method is based on a learning algorithm in order to improve identification quality and speed. The data driven model MO is capable of interpreting the environmental data ED and the operational data OD within the wind farm IT infrastructure 1 as well as loads of specific network components in order to differentiate what additional traffic and/or load of specific first network components is caused by a component or a user or a sensor or by an unauthorized access from a cybercriminal. The additional traffic and/or load of one or more of the first network components is identified and classified.

The trained data driven model MO is based on the analysis of the operational data OD and the environmental data ED. The operational data OD of a wind farm are obtained from the repository REP. The operational data OD comprise technical data of the number of wind turbines and the number of subsystems and organizational data indicating tasks to be dealt with in the wind farm 100 in the future. The repository REP consists of a plurality of databases DB. By way of example only, the repository REP according to FIG. 2 consists of five databases DB.

A first database consists of subsystem information SSI. Subsystem information SSI consists of current and historic states of the respective subsystems, such as rotor speed during a specific time and during a specific wind condition, wind turbine stop, generated power, processor load, network traffic, signature of network traffic, and so on.

A second database consists of user information UI. User information consists of information about those users which are allowed to access the wind farm 100. In addition to an identifier of a user, his role (administrator, IT specialist, operator, and so on), his specific qualifications or skills (educated for onshore or offshore wind turbines, IT knowledge, electric knowledge, mechanical knowledge, vacation schedule and so on) are stored.

A third database DB relates to a maintenance/task list MTL. The maintenance/task list MTL consists of a ticketing system providing information about a task/problem, a time when a specific task has to be dealt with, required skills to deal with the task, and optionally, a specific user or a user role.

A fourth database DB consists of information about operation history OH. This information can comprise all those data which are monitored and provided by the SCADA system 130.

A fifth database DB comprises an optional information about a user behavior model BMU and/or subsystems behavior model(s) BMS against tasks. The behavior models BMU, BMS are used to provide predictive information about the operation and/or state of the wind farm and its subsystems, where the behavior models are provided by state of the art machine learning techniques, like reinforcement learning and artificial neural networks. The behavior models BMU, BMS are trained using audit logs, i.e., operation history, available in the fourth database DB. Modelling of the user in the subsystems may be made by using so called digital twins. The trained data driven model can be considered as group of models containing BMU, BMS and other models based on decision trees/behavior trees/random forest. Models can be chained/pipelined ex: input is fed to first model and its output is fed to second model or aggregated/combined ensemble (bagging, boosting, stacking etc.).

The environmental data ED may be provided by the wind farm measuring device 201 and consists of weather conditions like temperature, wind speed, wind direction, air pressure and so on. The environmental data ED further consists of information about a forecast of environmental conditions for a specific (predetermined) period of time. The forecast of the weather conditions may be made on-site or provided by a third party.

The operational data OD and the environmental data ED are used for determining, for a predetermined time interval, a prediction of the operation and/or states of the wind farm 100 by the trained data driven model MO. The operational data OD and the environmental data ED are fed as digital input to the trained data driven model MO and the trained data model MO provide the prediction of the operation and/or states of the wind farm and its subsystems, respectively as a digital output for the predetermined time interval.

The prediction of the operation and/or states of the wind farm and its subsystems is compared with the operational conditions OC. At the operational conditions result from current or past user machine interactions of a user and one of the wind turbines and/or the subsystems it can be determined whether a deviation of the obtained operational conditions OC from the prediction of the operation and/or states of the wind farm is present. In case of a deviation, the information about an authorized access UACC is output.

The comparison unit COMP uses the repository REP to judge the current or sequence of operations to make the final decision about an unauthorized access.

Embodiments of present invention as described above are able to deal with a scenario where an attacker steals the credential of a wind park user by using social engineering or phishing etc. and try to attempt some malicious operations in the wind farm. It is impossible to detect this attack using existing security controls available today. With a behavior model BMW, MU implemented in the trained data driven model MO, each operation of the attacker is analyzed against predicted behavior against current prevailing operating conditions in the wind farm. It is almost impossible for an attacker to match the genuine user operation signature on all malicious operations.

Another example of detection is an operation which usually is carried out against a so-called MORS ticket, where the operation is carried out without it. Another example is that a task which is carried out by an attacker is not within the planned maintenance schedule, i.e., not stored within the third database MTL. If a user is trying to get access to the wind farm which is marked as being on vacations, it is assumed to be an attack.

The method as described above provides an application layer level firewall capability for detecting and preventing cyber-attacks. The method is capable of detecting attacks which are impossible to detect by other lower-level mechanisms. The method provides in-depth insights to day-to-day operations occurring at wind park. Being based on behavior models for user and subsystems against a dynamic set of operation conditions in a wind park, a precise detection of attacks is possible. Operating conditions include a comprehensive set of static and dynamic data from operating environment like weather, subsystem, user roles, tasks, skills, vacation plans, maintenance plans, software release, updated cycles, maintenance tickets with predicted turn around time, profile of activities done during various phases like commissioning/operations and so on. The method uses state of the art machine learning methods like reinforcement learning, artificial neural networks and decision trees to build predictive sequential behavior models. A data driven model is used to predict a very next operation to be initiated by a user machine interaction, wherein any deviation from expected operation/state is flagged as a potential cyber attack The method as described above has the advantage that its response is much faster towards cyber-attacks, especially as wind farms are unmanned and therefore more vulnerable towards attacks from inside and outside the wind farm. The method is able to identify threats and classify them, to provide fast response capabilities to cyber-attacks, to identify anomalies on the wind farm IT infrastructure as well as an unauthorized access to the wind farm IT infrastructure, and to support automated patching of identified vulnerabilities.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented identifying an unauthorized access to a wind farm where the wind farm comprises a number of wind turbines, a number of subsystems for controlling and/or monitoring the number of wind turbines and a repository for storing wind farm data,
   wherein at each time point of one or more time points during the operation of the wind farm the following steps are performed:
   i) obtaining operational data of the wind farm from the repository, wherein the operational data includes technical data of the number of wind turbines, vibration data from drive trains of the wind turbines, the number of subsystems and organizational data indicating tasks to be dealt with in the wind farm in the future;
   ii) obtaining environmental data provided by a wind farm measuring device;
   iii) determining, for a predetermined time interval, a prediction of the operation and/or states of the wind farm by processing the operational data and the environmental data by a trained data driven model, where the operational data and the environmental data are fed as a digital input to the trained data driven model and the trained data driven model provides the prediction of the operation and/or states of the wind farm as a digital output;
   iv) obtaining operational conditions of the wind farm resulting from current or past user machine interactions of a user and one of the wind turbines and/or the subsystems, wherein the operational conditions, comprising measured frequency of vibration of the wind turbines, are obtained within the predetermined time interval; and v) determining from the digital output of the prediction of the operation and/or states of the wind farm an unauthorized access to the wind farm by comparing the operational conditions with the prediction of the operation and/or states of the wind farm, the unauthorized access having a predetermined deviation of the obtained operational conditions from the prediction of the operation and/or states of the wind farm, wherein the operational data and/or the operational conditions are obtained by a digital condition monitoring system, and wherein the digital condition monitoring system is a vibration monitoring system.

2. The method according to claim 1, wherein the trained data driven model is:
a neural network;
a cognitive algorithm;
reinforcement learning;
based on pattern recognition; and
based on artificial intelligence.

3. The method according to claim 1, wherein the trained data driven model consists of a user behavior model considering a user role and user skills, where, according to the user behavior model, a user is capable of performing a specific set of tasks authorized by his user role and user skills.

4. The method according to claim 3, wherein each task consists of a set of operations performed against a set of the subsystems.

5. The method according to claim 1, wherein an information based on the unauthorized access is output via a user interface.

6. The method according to claim 1, wherein the operational data are additionally obtained by a sensor.

7. A computer system comprising one or more processors and a memory containing instructions which is executed by the one or more processors for computer-implemented identifying an unauthorized access to a wind farm where the wind farm comprises a number of wind turbines, a number of subsystems for controlling and/or monitoring the number of wind turbines and a repository for storing wind farm data,
wherein the computer system for computer-implemented identifying an unauthorized access to a wind farm comprises a condition monitoring system configured to perform at each time point of one or more time points during the operation of the wind farm the following steps:

i) obtaining operational data of the wind farm from the repository, wherein the operational data comprises technical data of the number of wind turbines, vibration data from drive trains of the wind turbines, the number of subsystems and organizational data indicating tasks to be dealt with in the wind farm in the future;

ii) obtaining environmental data provided by a wind farm measuring device;

iii) determining, for a predetermined time interval, a prediction of the operation and/or states of the wind farm by processing the operational data and the environmental data by a trained data driven model, where the operational data and the environmental data are fed as a digital input to the trained data driven model and the trained data driven model provides the prediction of the operation and/or states of the wind farm as a digital output;

iv) obtaining operational conditions of the wind farm resulting from current or past user machine interactions of a user and one of the wind turbines and/or the subsystems, wherein the operational conditions, comprising measured frequency of vibration of the wind turbines, are obtained within the predetermined time interval; and v) determining from the digital output of the prediction of the operation and/or states of the wind farm an unauthorized access to the wind farm by comparing the operational conditions with the prediction of the operation and/or states of the wind farm, the unauthorized access having a predetermined deviation of the obtained operational conditions from the prediction of the operation and/or states of the wind farm, wherein the operational data and/or the operational conditions are obtained by the condition monitoring system, wherein the condition monitoring system is a digital condition monitoring system, and wherein the digital condition monitoring system is a vibration monitoring system.

8. A wind farm comprising a wind farm IT infrastructure, where the wind farm IT infrastructure comprises a number of wind turbine processing units, a wind farm controlling unit, and a supervisory control and data acquisition system as first network components, the first network components being communicable connected, via a router, to second network components outside the wind farm IT infrastructure, where the second network components comprise the wind farm measuring device, a user station, and a grid operator station, wherein the wind farm comprises the computer system for computer-implemented identifying an unauthorized access to a wind farm according to claim 7.

9. A computer program product, comprising a computer readable hardware storage device having computer readable program code stored therein, said program code executable by a processor of a computer system to implement a method with program code, which is stored on a non-transitory machine-readable carrier, for carrying out a method according to claim 1 when the program code is executed on a computer.

* * * * *